United States Patent [19]
Do et al.

[11] Patent Number: 5,936,785
[45] Date of Patent: Aug. 10, 1999

[54] POSITIONABLE MULTI-OPTIC HOLDER

[75] Inventors: Khiem Ba Do, Sunnyvale; David F. Arnone, Mountain View, both of Calif.

[73] Assignee: New Focus, Inc., Santa Clara, Calif.

[21] Appl. No.: 09/152,352

[22] Filed: Sep. 14, 1998

Related U.S. Application Data

[62] Division of application No. 08/924,587, Sep. 5, 1997, Pat. No. 5,852,519.

[51] Int. Cl.[6] .................................................. G02B 7/02
[52] U.S. Cl. .................................... 359/822; 359/819
[58] Field of Search .................................. 359/819, 821, 359/822, 811

[56] References Cited

U.S. PATENT DOCUMENTS

| | | | |
|---|---|---|---|
| 4,408,830 | 10/1983 | Wutherich | 359/813 |
| 5,307,209 | 4/1994 | Iaquinto et al. | 359/811 |
| 5,497,272 | 3/1996 | Wun | 359/821 |
| 5,617,260 | 4/1997 | McNiven et al. | 359/821 |
| 5,703,729 | 12/1997 | Takeda et al. | 359/821 |
| 5,706,255 | 1/1998 | McKay | 368/10 |
| 5,790,326 | 8/1998 | Eckel, Jr. et al. | 359/823 |

*Primary Examiner*—Georgia Epps
*Assistant Examiner*—Ricky Mack
*Attorney, Agent, or Firm*—Wilson, Sonsini, Goodrich & Rosati

[57] ABSTRACT

An optic mount for holding an optic element in a light path is provided. The optic mount includes a base and a holder. A base and a holder are pivotally connected. The holder includes an optic bore. The optic bore is dimensioned to contain an optical element. Arcuate movement of the holder with respect to the base allows an optic element to be moved from a first position, in which the light path passes through the optic bore to a second position in which the optic bore avoids the light path. In another embodiment of the invention, a modular configuration of optic mounts for holding a plurality of optic elements in a light path is provided. The modular configuration includes at least two base and holder pairs. Each base and holder are pivotally connected. Each holder includes an optic bore. The optic bores of both holders are dimensioned to hold an optical element. The first and second bases are aligned by complementary interlocking elements on the opposing faces of each of the base units. Arcuate movement of each holder with respect to its base allows optic elements to be moved individually from a first position in which the light path passes through the optic bore to a second position in which the optic bore avoids the light path. The optic bores can clamp thin optic elements axially and thick optic elements radially.

12 Claims, 13 Drawing Sheets

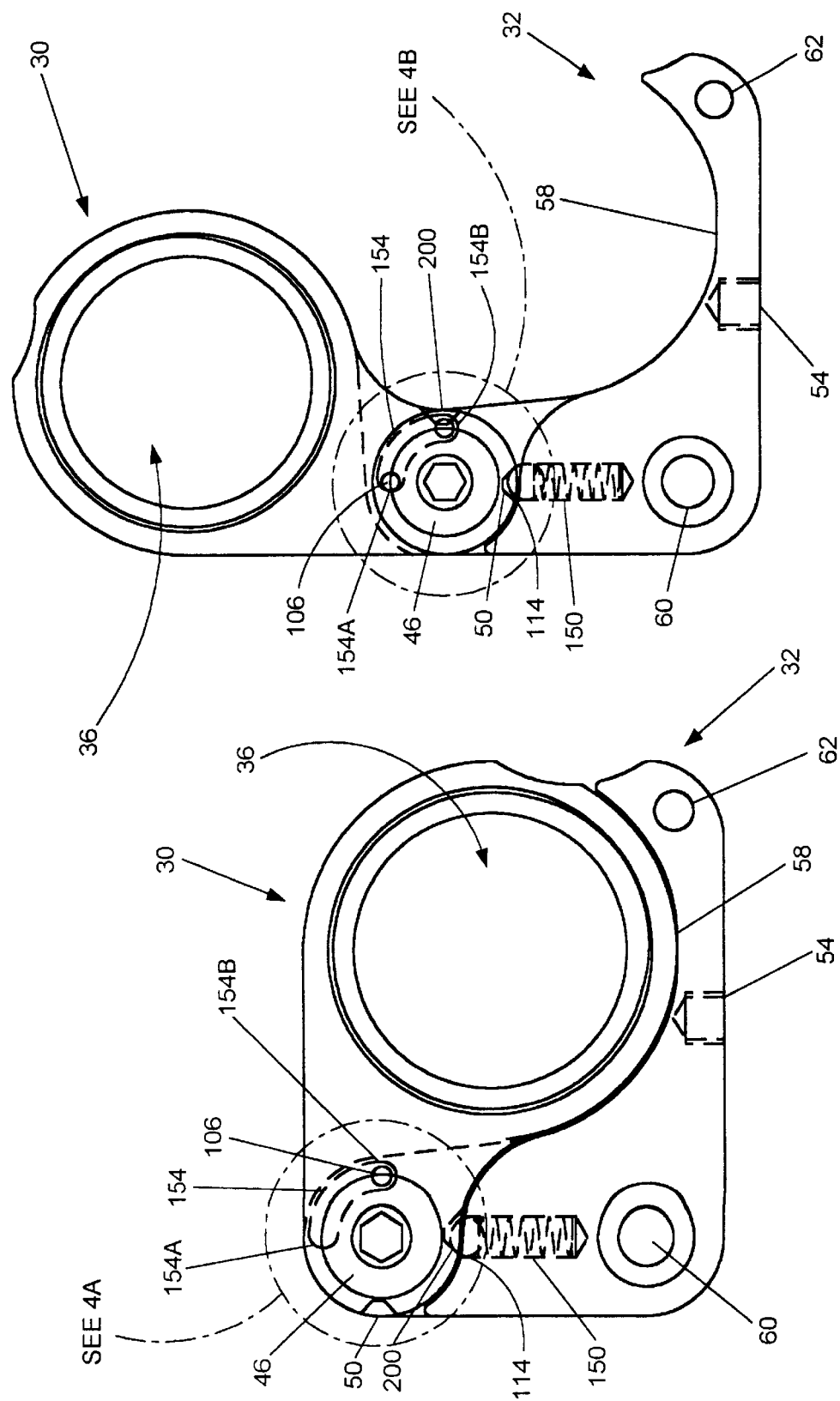

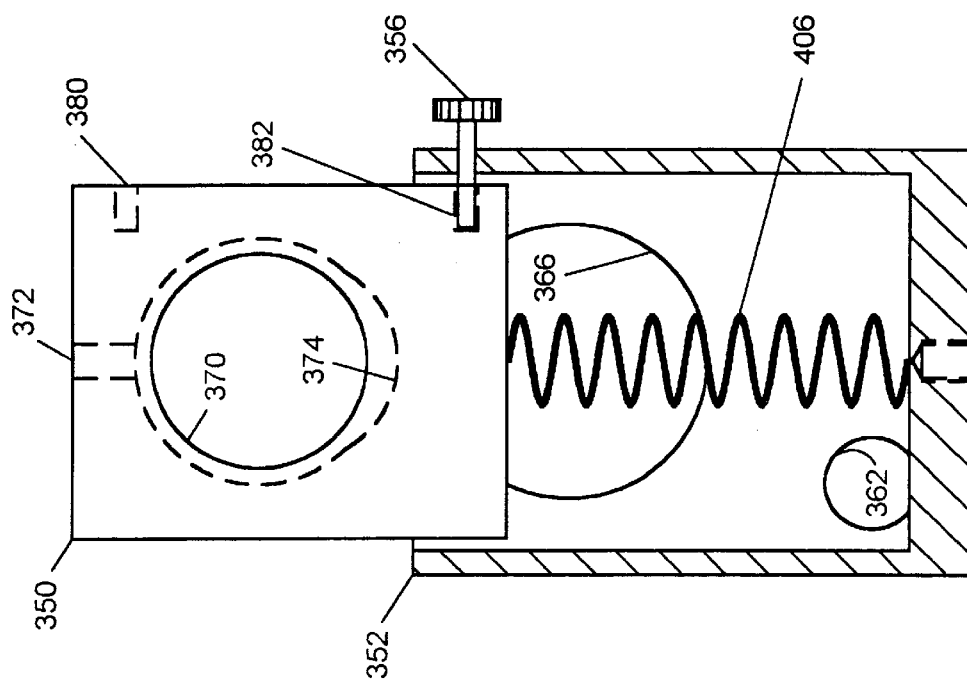
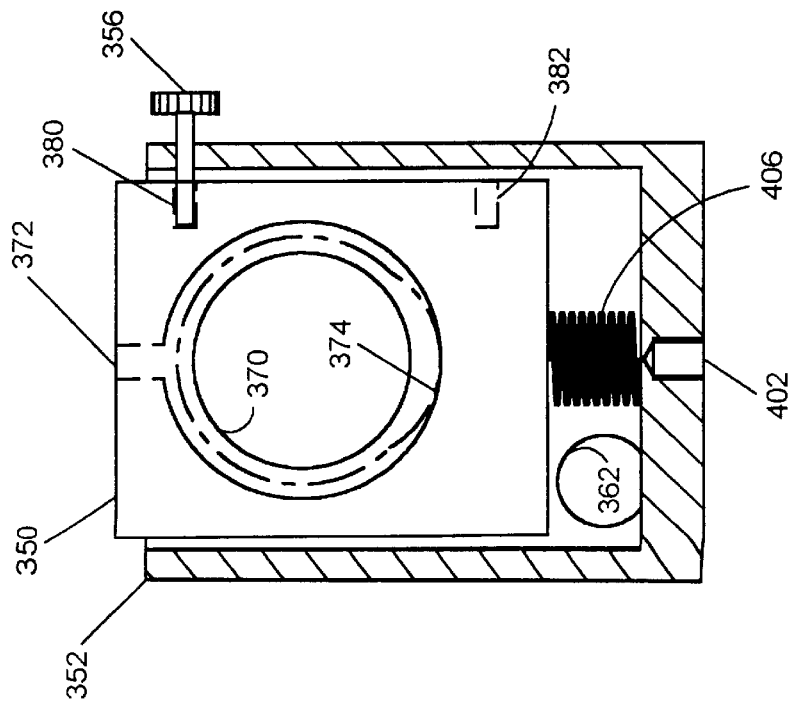

POSITIONABLE MULTI-OPTIC HOLDER

This application is a division of U.S. patent application Ser. No. 08/924,587, filed Sep. 5, 1997, now U.S. Pat. No. 5,852,519 entitled "Positionable Multi-Optic Holder", which is incorporated herein by reference in its entirety.

BACKGROUND OF THE INVENTION

1. Field of the Invention

This invention relates generally to optical instruments, and particularly to a mounting assembly for positioning thick and thin optics in and out of the path of a light beam.

2. Description of Related Art

In the field of experimental optics, it is customary to position the various optical elements on an optical bench. An optical bench is quite commonly a massive block of rigid material supported by a shock absorbing mount. Optic elements are used for many purposes, including: refracting, reflecting, diffracting, focussing, and calibrating a light beam.

Some of these optic elements, such as neutral density and colored glass filters, thin film polarizers, waveplates, and lenses, are relatively thin (1–3 mm) and fragile and require a optic mount which axially compresses the optical element. Other optical elements, such as mounted bandpass filters, mounted crystal polarizers, and mirrors, are relatively thick and are preferably held in another type of optic mount which provides for radially clamping the optic element. These mounts are costly, and a typical setup will require separate mounts for holding thin and thick optic elements.

Each optical mount on a optic bench is precisely located at a specific position in the path of a light beam. Initially, each optic mount contains a specific optic element. As an experiment progresses, numerous permutations of elements may be required at each position in the path of the light beam. Traditionally, this requires not only replacing each element, but may as well require changing the optic mount itself. Switching optic elements is a time consuming task, particularly if the mount itself also needs to be changed, to accommodate the new optic element.

Some experiments require the repeated substitution of a predefined set of optic elements in the path of a light beam. For example, measurements of laser power may require the positioning of a broad range of filters in the path of the laser. As each filter is placed within the path of the light beam, measurement of the characteristic of the output beam from each filter are made over a large dynamic range. If many lasers need to be calibrated, many substitutions of optic elements will need to be made. Typically this involves the time consuming task of manually replacing various optic elements within a single holder. If the elements vary sufficiently in their dimensional characteristics, such as thickness then a single optic mount may not be sufficient. In this instance, the added task of changing optic mounts may be required.

What is needed, is an optic mount that allows optical elements to be easily changed over from one set up to the next, and yet also provides for precise repeatable positioning of each optical element.

SUMMARY OF THE INVENTION

An object of the invention, is to provide a holder for optic elements that will allow an optic to be moved out of and into the path of a light beam.

Another object of the invention, is to provide a holder for optic mounts that will allow accommodate thick and thin optics.

A further object of the invention, is to provide individual holders for optic elements that can be combined to form a holder that will accommodate multiple optical elements.

Still a further object of the invention, is to provide an optic mount that is simple and inexpensive and that allows precise repeatable locating of one or more optic elements out of and into the path of a light beam.

In an embodiment of the invention, an optic mount for holding an optic element in a light path is provided. The optic mount includes a base and a holder. The base includes opposing first and second base faces and a first pivot member. The holder includes opposing first and second holder faces, an optic bore and a second pivot member. The optic bore extends from the first to the second holder face. The optic bore is dimensioned to contain an optical element. The second pivot member is suitable for pivotally connecting to the first pivot member to allow arcuate movement of the holder with respect to the base. The arcuate movement extends from a first position in which the light path passes through the optic bore to a second position in which the optic bore avoids the light path. In an alternate embodiment the first position could avoid the light path and the second position could position the optic bore within the light path.

In another embodiment of the invention, a modular configuration of optic mounts for holding a plurality of optic elements in a light path is provided. The modular configuration includes a first base, a second base, a first holder and second holder. The first and second base each include opposing first and second base faces. The first base is aligned with the second base by complementary interlocking elements defined on the first and the second base faces. The first and second bases also include respectively, a first and a second pivot member. The first and second holder also include opposing first and second holder faces. Each of the opposing faces of the first and said second holders define between them a corresponding optic bore. The first optic bore in the first holder and the second optic bore in the second holder are each dimensioned to contain an optical element. The first and the second holders also define respectively, a third and a fourth pivot member. The third pivot member is suitable for pivotally connecting to the first pivot member to provide for the arcuate movement of the first holder with respect to the first base. The fourth pivot member is suitable for pivotally connecting to the second pivot member to provide for arcuate movement of the second holder with respect to the second base. The arcuate movement extends from a first position in which the light path passes through a corresponding optic bore to a second position in which the corresponding optic bore avoids the light path.

In a further embodiment of the invention, a dual bore mount for optical elements is provided. The dual bore mount includes a mounting block and a radial and compressive fastening member. The radial fastening member allows thick optic elements to be held in the dual bore mount. The compressive fastening member allows thin optic elements to be held in the dual bore mount. The mounting block includes opposing first and second faces. The mounting block includes a bore, a counterbore, and a shoulder. The bore has a first diameter and extends from the first to the second opposing face. The counterbore has a second diameter larger than the first diameter and extends from the first face to the shoulder which is located between the first and the second face. An arcuate segment of relief is defined in the counterbore. The arcuate segment of relief extends from the first face toward the second face. The arcuate segment of relief enlarges an arcuate portion of the counterbore to provide two parallel lines of contact extending from the first toward the second face. The mounting block also includes a radial fastening member. The radial fastening member is located within the counterbore and opposite the two parallel lines of contact. The radial fastening member allows a thick cylindrical optic element to be radially clamped against the two parallel lines of contact within the counterbore. The mounting block additionally includes a compressive fastening member adapted to fit within the counterbore and to compressively clamp a thin cylindrical optic element in the counterbore against the shoulder.

In another embodiment of the invention a telescoping optic mount for holding an optic element in a light path is disclosed which includes a base a holder and a bias member. The base defines a cavity between opposing first and second base faces. The holder is dimensioned to fit within the cavity. The holder includes opposing first and second holder faces. The first and second holder faces define an optic bore extending from the first to the second holder face. The optic bore is dimensioned to contain an optical element. The bias member is positioned in the cavity between the holder and the base to bias the holder from a first position within said cavity to a second position in which the holder extends from the cavity. The optic bore may be aligned with a light path in either of the first and second positions.

In another embodiment a modular configuration of the telescoping optic mount is disclosed.

BRIEF DESCRIPTION OF THE FIGURES

FIG. 3A is an elevation view of the optic mount in a first position.

FIG. 3B is an elevation view of the optic mount in a second position.

FIGS. 10A-B are cross-sectional views of the telescoping optic holder of FIGS. 8-9 in the retracted and extended positions.

DETAILED DESCRIPTION

The current invention provides a pop-up holder for easily inserting or removing a filter, or other optical element, into a light path. This can be done without the need to touch the optic. The optic holder is designed for a modular configuration. Multiple elements can be stacked to allow a range of filters to be presented to a light path. Thus, filter values may be incrementally added or subtracted. In either the single or modular configuration the optic mount(s) can be attached to a support column. The optic mount can accommodate either thick or thin optics.

Single Mount—Standalone Configuration

Figure 1:
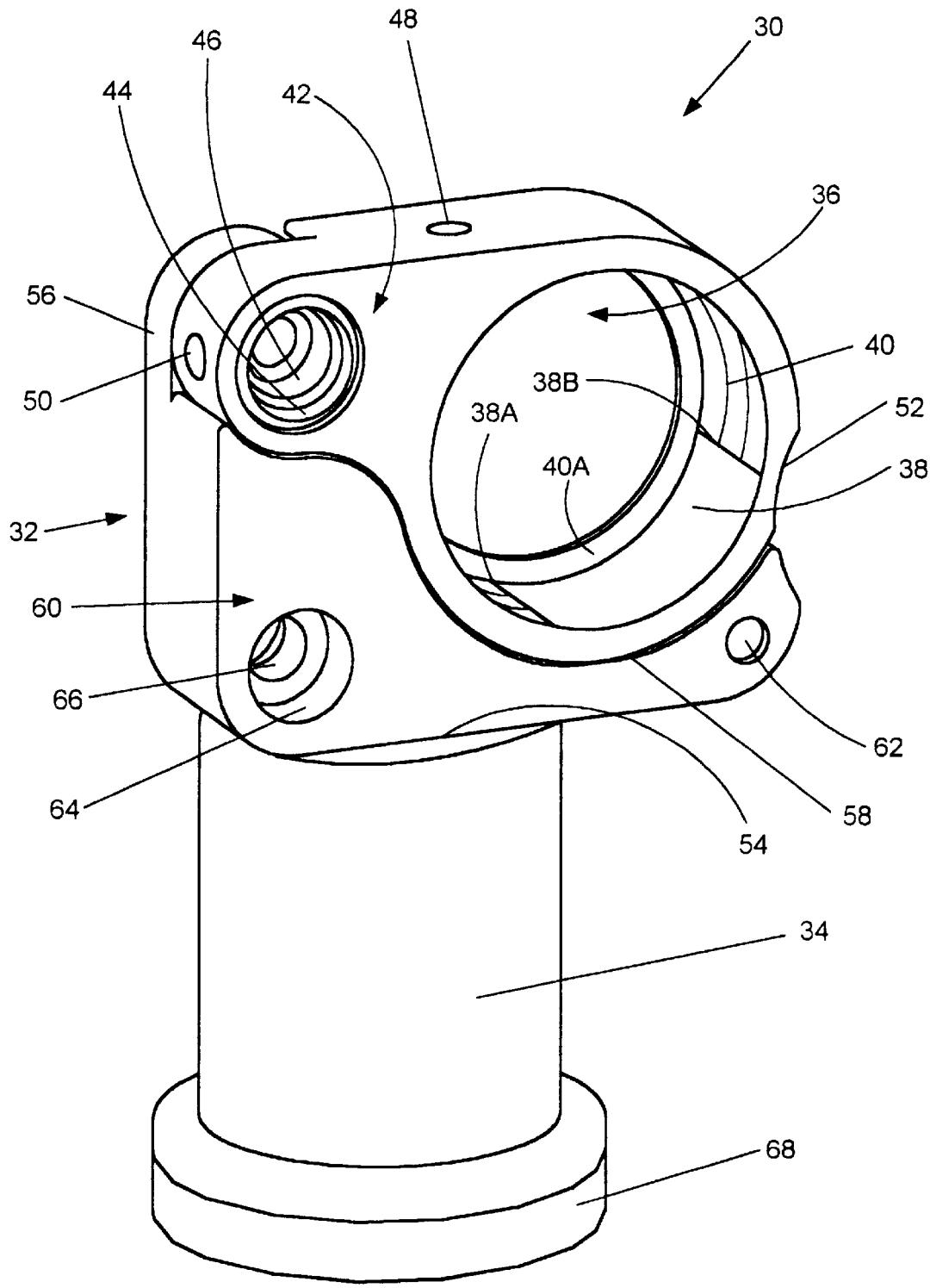
FIG. 1 is an isometric view of a single optic mount on a support column.

FIG. 1 is an isometric view of a single optic mount on a support column. The optic mount comprises a filter holder 30 and a base 32. The base is shown mounted to a column 34. The filter holder portion comprises an opening 36 for holding an optical element and a pivot portion 42. The opening 36 comprises: a threaded counterbore 40 with a shoulder 40A, an arcuate relief segment 38 with opposing edges 38A-B, and a threaded hole 48 for a set screw. The pivot portion 42 comprises a countersink 44, shoulder bolt 46 and a pair of detents of which hold-open detent 50 is referenced. A knurled grip 52 is provided on the outer surface of the filter holder adjacent the opening 36. The base 32 comprises: a pivot portion 56, a lower locking portion 60; a locator 58; and a base mount 54. The lower locking portion 60 comprises: a bore 66, a counterbore 64 and a detent 62. The column 34 includes a clamping flange 68.

The filter holder 30 can accommodate either thick or thin optic elements. Thick optic elements are held in place by a three point fastening system. The three point fastening system is defined by edges 38A and 38B of the arcuate relief segment 38. The arcuate relief segment is cut into or formed from the threaded counterbore 40. A thick optic placed in opening 36 will be supported at two points by edges 38A-B. The thick optic is compressively fastened in the opening through the clamping action of a set screw positioned in threaded hole 48. As the set screw is tightened, the thick optic element is held at three points, i.e., the tip of the set screw and the two edges 38A-B. Thin optic elements are held in opening 36 with a different fastening system, comprising shoulder 40A in cooperation with a threaded retaining ring, which will be shown in FIGS. 2A-B. Thin optic elements are placed in opening 36 against the backwall 40A of threaded counterbore 40. Then the retaining ring is threaded into the counterbore 40 until it clamps the thin optic element between shoulder 40A and the ring.

The pivot portions 42 and 56 of respectively the filter holder and the base allow the filter holder to be moved between a first and a second position. In the first position, shown in FIG. 1, the filter holder is in contact with locator 58 of the base 32. Using knurled grip 52, the filter holder can be moved to a second position displaced arcuately approximately 90 degrees in a counter clockwise direction from the first position. The specifics of the pivot will be set forth in later figures and specifically FIGS. 4A-B and 5A-B. The functionality of lower locking portion 60 will be described in FIGS. 5–7, in which multiple optic mounts are arranged in a modular configuration utilizing the various components of the lower locking portion 60.

The column 34 is rigidly attached to the base 32 by means of a double headed set screw, which extends from the column into a base mount 54 in the lower surface of base 32. The column has a clamping flange 68 at its bottom. The clamping flange allows the column to be mounted on an optic breadboard.

Figure 2A:
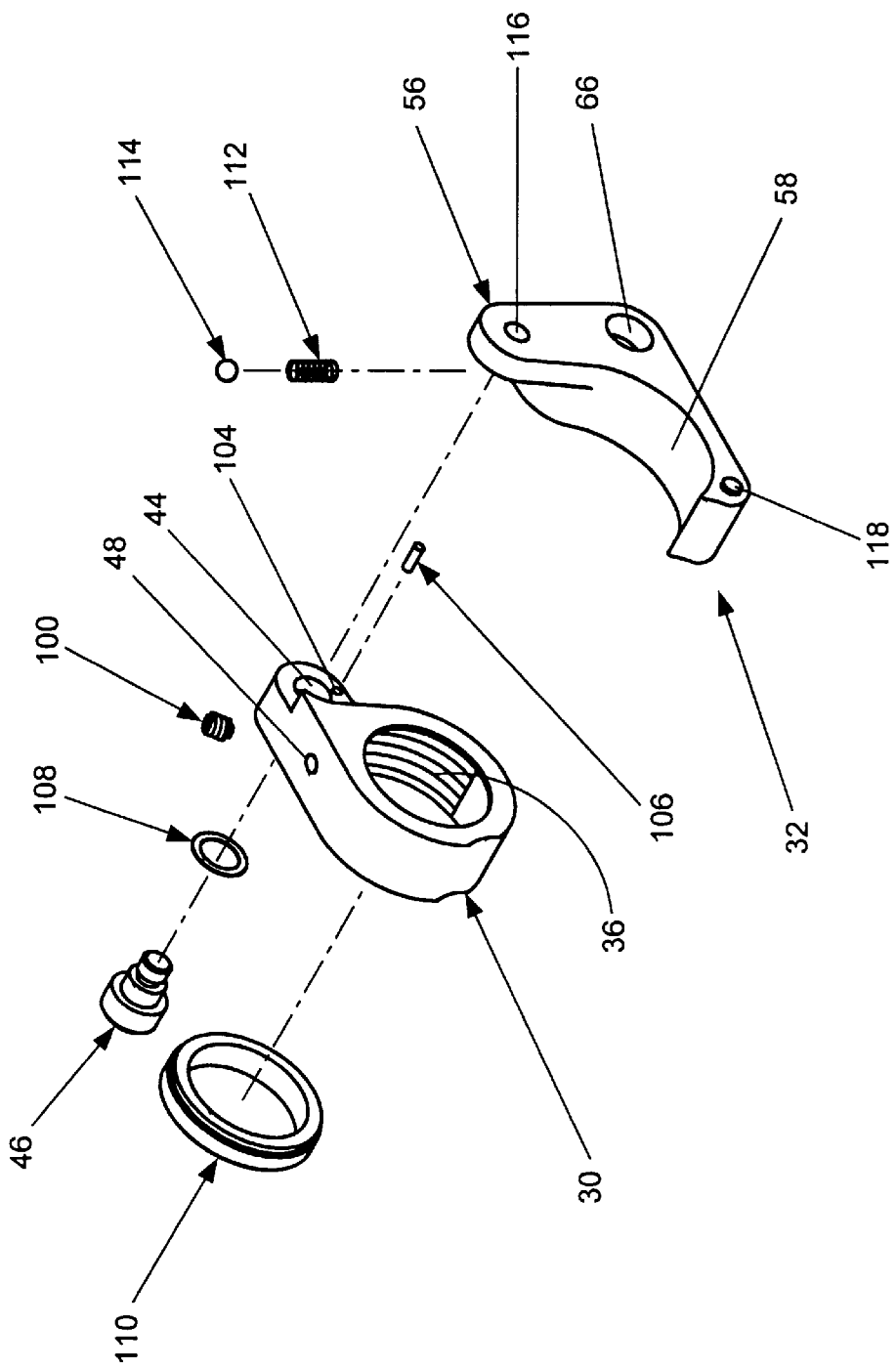
FIG. 2A is an exploded isometric of the back side of the optic mount.
Figure 2B:
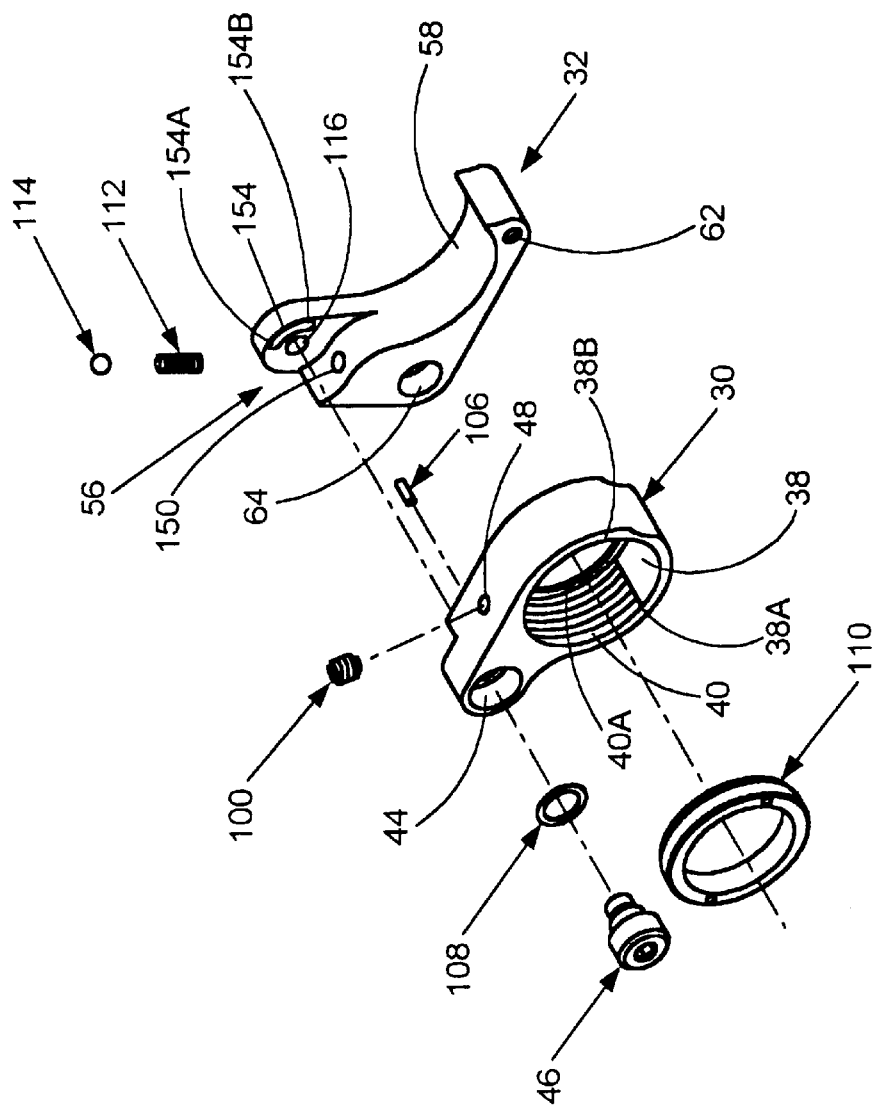
FIG. 2B is an exploded isometric view of the front side of the optic mount.

FIGS. 2A-B are opposing exploded isometric views of respectively the back side and front side of the optic mount shown in FIG. 1. The optic mount comprises: base 32, filter holder 30, optic locking ring 110, shoulder bolt 46, and friction ring 108. The base 32 comprises: detent 62, nipple 118, counterbore 64, bore 66, blind hole 150, spring 112, ball 114 and an arcuate groove 154 with an upper end 154A and a lower end 154B. The filter holder 30 comprises threaded counterbore 40, arcuate relief 38, threaded hole 48, countersink 44, set screw 100, locator pin 106 and pin hole 104.

The optic mount is characterized by three distinct features which are: holding an optic element; rotating an optic element; and allowing a plurality of optic elements to be joined in a modular fashion. The third of these features will be set forth in FIGS. 5–7. The first of these features, i.e., the holding of an optic element is accomplished by either the cooperative action of the optic locking ring 110 and the shoulder 40A of the threaded counterbore 40 or by set screw 100 and the opposing edges 38A-B of the arcuate relief segment 38. In the first instance, a thin optic element is compressively retained within opening 36 by optic locking ring 110. In the second instance a thick optic element is retained within opening 36 by the combination of set screw 100 in cooperation with the edges 38A-B of arcuate relief segment 38.

The second distinct feature of the optic mount is that it allows for the rotation of the optic element from a first position in a light path, to an second position removed from the light path. The filter holder is rotatably clamped to the base by shoulder bolt 46. The shoulder bolt is inserted through bore 66 in the filter holder and threaded into threaded hole 116 in the base 32. Countersink 44 is dimensioned to allow the shoulder of the shoulder bolt to pass through it. Therefore even when the shoulder bolt is fully engaged, the filter can rotate with respect to the base. The ease of rotation of the filter holder with respect to the base is governed by friction ring 108. The friction ring is compressively clamped between the head of the shoulder bolt 46 and the shoulder of counterbore 64. A positive limit on the amount of travel of the filter holder 30 with respect to the base is provided. Locator pin 106 is press fit into pin hole 104 in the filter holder 30. Pin hole 104 is radially displaced from the center line of countersink 44. The pin extends into arcuate groove 154 in the base 32. As the filter is rotated from a first position in contact with the locator 58 of the base to a second position away from the locating surface, the pin contacts the upper end 154A of the arcuate groove. Thus, filter holder 30 can be rotated through an arc of approximately 90 degrees from a first position to a second position. As will be apparent to one skilled in the art, other stop mechanisms can be provided, e.g., the exterior surface of the filter could be profiled with a protrusion to contact the base in the second position. To hold the filter in either the first or second position a spring loaded positioning mechanism is provided. Specifically, a pair of detents in the filter holder operate in conjunction with a ball and spring assembly in the base portion to lock the filter holder in either the first or second position. Spring 112 and ball 114 are placed within blind hole 150 in the base 32. Then the filter holder including locator pin 106 is coupled to the base 32, thus retaining ball and spring within hole 150. As the filter holder is arcuately moved, the ball 114 sweeps across an outer arcuate surface of the filter holder which surface is concentric with the center line of shoulder bolt 46. Two detents displaced by an angle of 90 degrees are present on this swept surface. These detents are shown in FIGS. 3A-B and 5A-B. When ball 114 contacts either of these detents, it is pressed into the detent by spring 112 and biases the filter holder into either the first or second position.

FIGS. 3A-B are elevation views showing the filter holder in respectively a first and a second position with respect to the base. In the first position the filter holder is biased into contact at locator 58 of the base portion 32. The biasing is accomplished by means of ball 114 contacting hold-closed detent 200 in a manner to elastically bias the filter holder 30 to contact base 32. In the second position shown in FIG. 3B, the filter holder is shown rotated counter clockwise 90 degrees with respect to the first position. In this position, locator pin 106 associated with the filter holder 30 has been rotated to the point where it contacts the upper end 154A of arcuate groove 154 in the base 32. The contact between ball 114 and hold-open detent 50 maintains the filter holder 30 in the second position. An optic can be considered positioned within a light path in either the first or the second position.

Figure 4A:
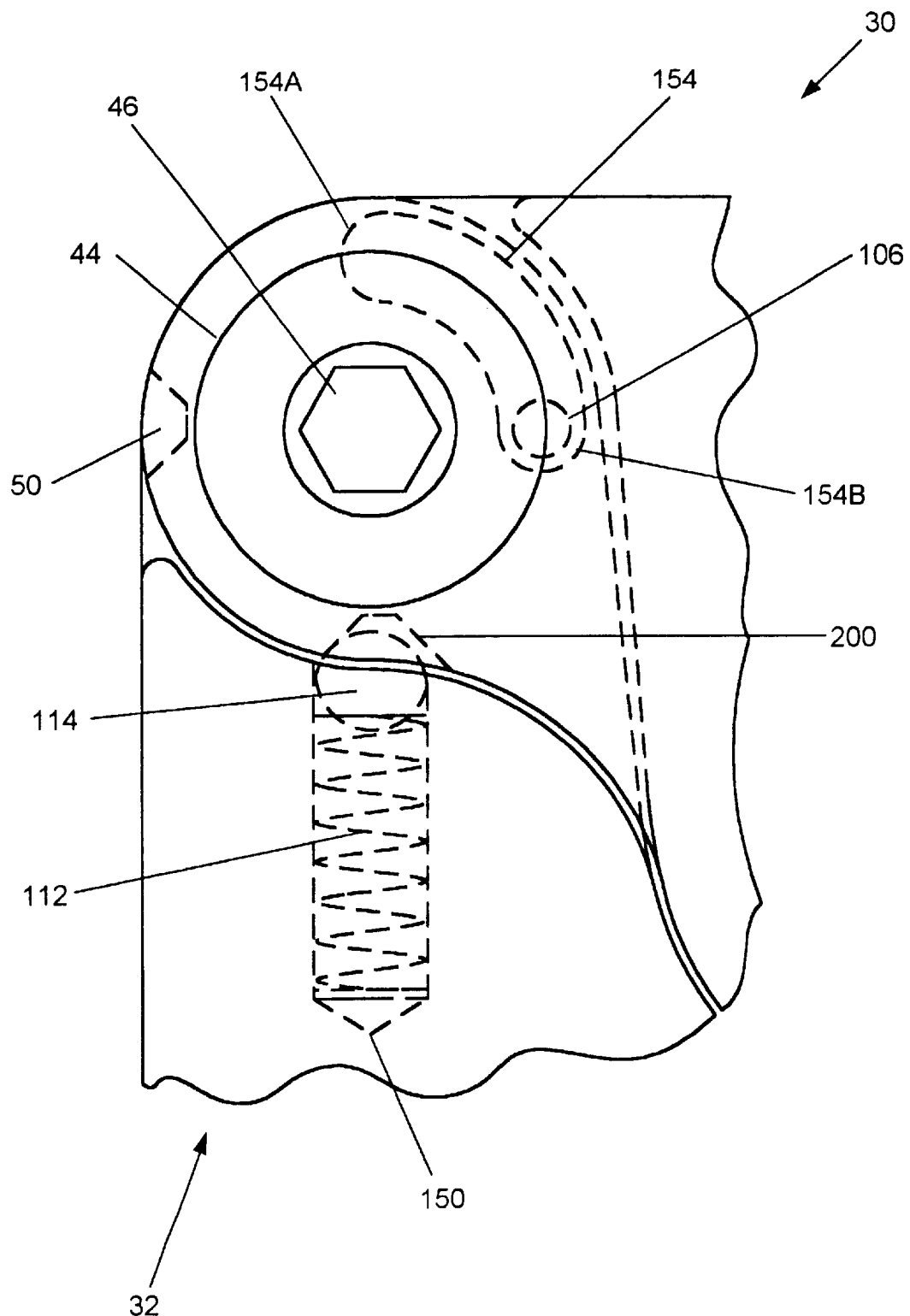
FIG. 4A is a detailed elevation view of the pivot portion of the optic mount in the first position.
Figure 4B:
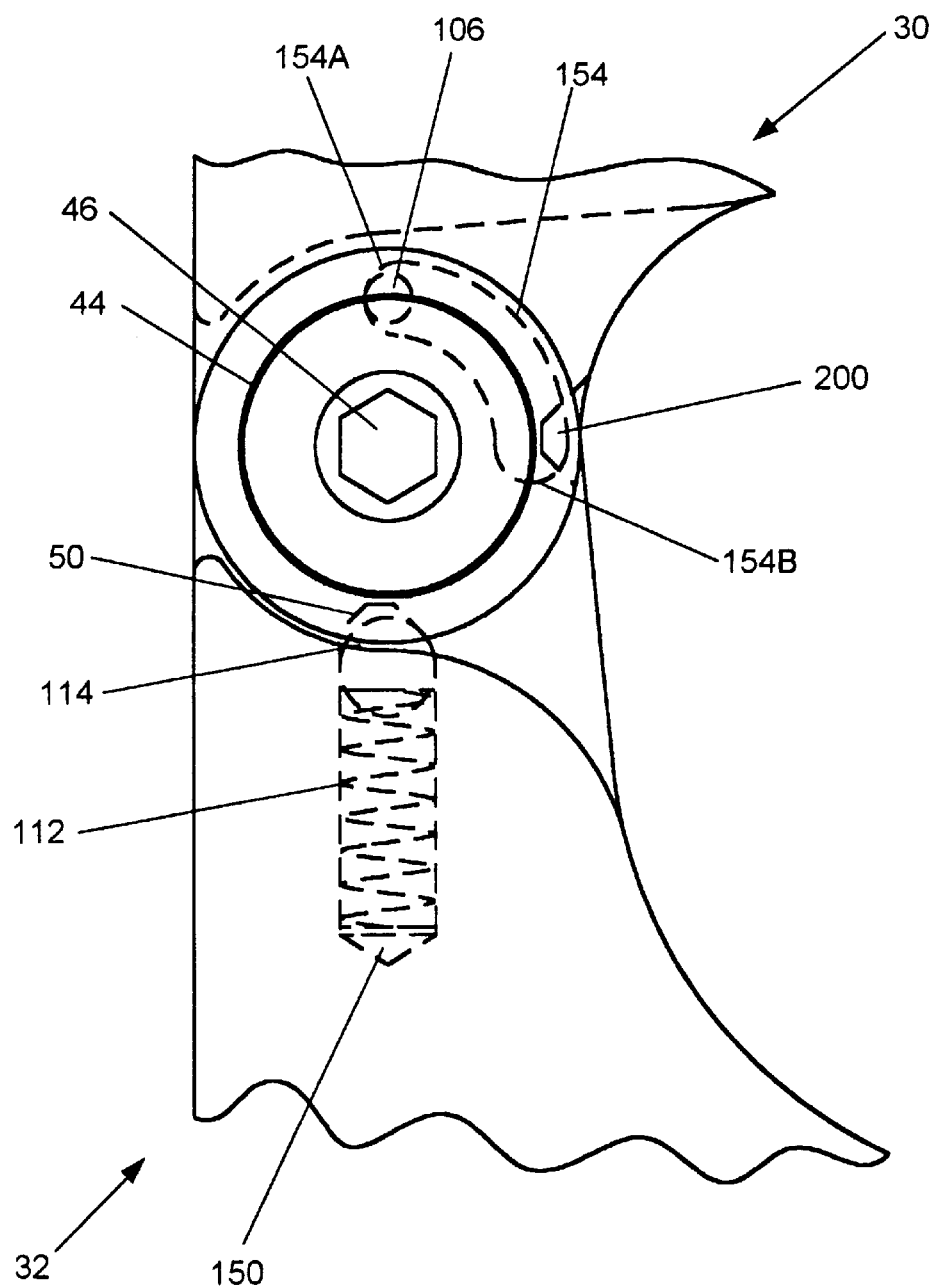
FIG. 4B is a detailed elevation of the pivot portion of the optic mount in the second position.

FIGS. 4A-B show in greater detail the pivot portions of the base and filter holder and correspond to the area highlighted in respectively, FIGS. 3A-B. The pivot assembly comprises shoulder bolt 46, countersink 44, hold-open detent 50, hold-closed detent 200, ball 114, spring 112, blind hole 150, locator pin 106 and upper end/lower end respectively 154A-B of arcuate groove 154.

In FIG. 4A, the filter holder is shown in the first position. In that position, spring 112 is shown pressing against both the bottom of blind hole 150 and against ball 114 with the result that ball 114 is biased into hold-close detent 200. As a result, the filter holder is compressively loaded against the base mount 54 of base 32 as shown in FIG. 3A. Locator pin 106 is adjacent to but not in contact with lower end 154B of arcuate groove 154. Thus, the location of the filter holder in the first position is determined by contact between locator 58 [shown in FIGS. 3A-B] and the filter holder, and not by contact between locator pin 106 and the lower portion of arcuate groove 154B.

In the second position shown in FIG. 4B, ball 114 is biased by spring 112 into contact with detent 50. This holds the filter holder in the second position. Concurrently, locator pin 106 is in contact with the upper end 154A of arcuate groove 154. Thus, contact between locator pin 106 and upper end 154A of the arcuate groove provides a positive stop which limits the amount of travel of filter holder 30 with respect to base 32, and the detent holds the filter in that position. Naturally, the detent alone could be used to both limit travel and maintain the filter holder in the second position.

Multiple Mounts—Modular Configuration

As mentioned above in connection with FIGS. 2A-B, the optic mount includes three features. The third of these, allowing a plurality of optic elements to be joined in a modular fashion, will be described in FIGS. 5–7.

Figure 5:
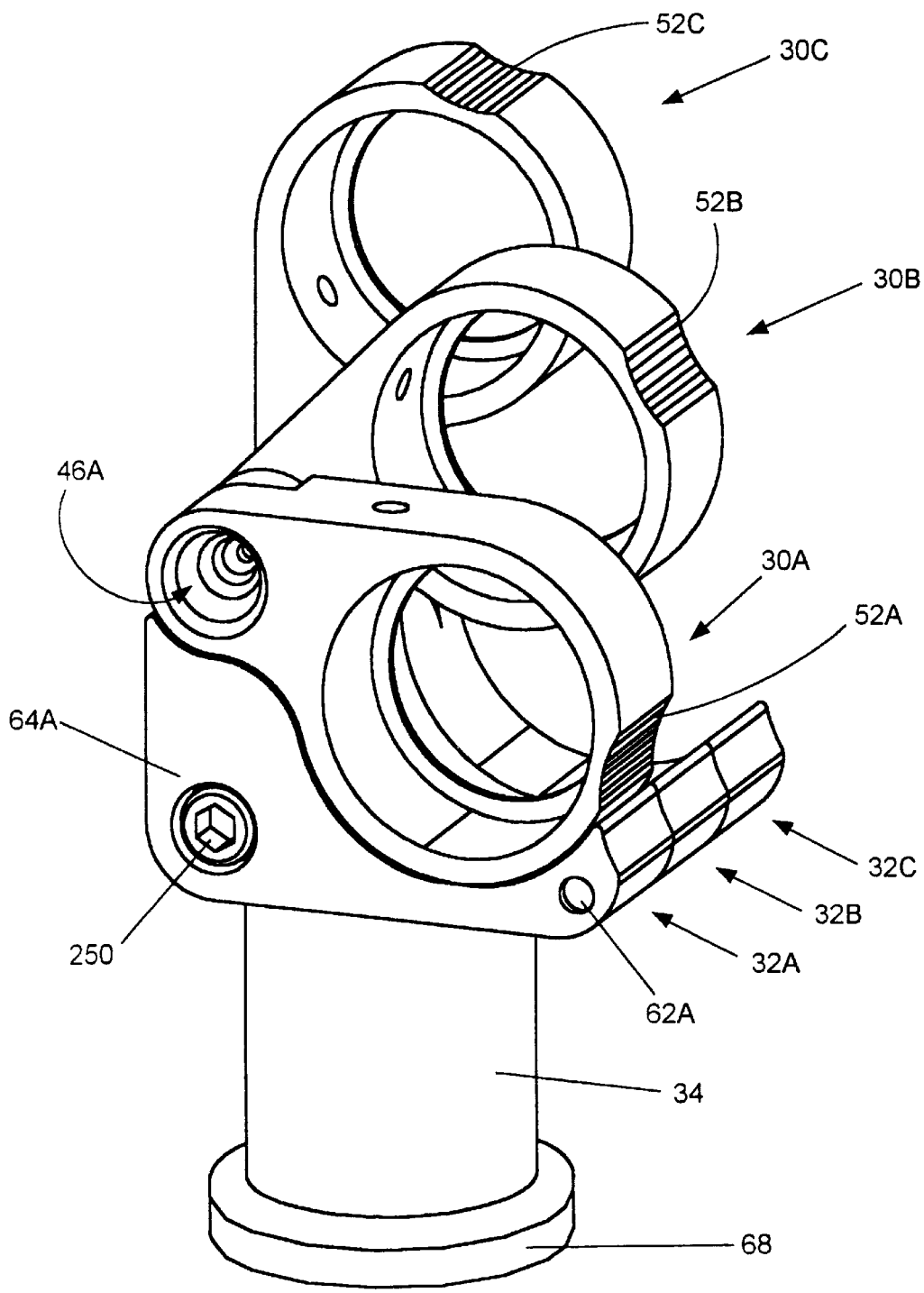
FIG. 5 is an isometric view of the front side of three optic mounts in a modular configuration supported by a column.

FIG. 5 shows three optic mounts in a modular configuration. The three optic mounts are shown supported on the column 34. The three optic mounts comprise base portions 32A–C associated with respectively filter holders 30A–C. Each of the filter holders 30A–C is shown with knurled grip portions, respectively 52A–C. The knurled grip facilitates the movement of the filter holder between the first and second positions. Each of the filter holders rotates about an individual shoulder bolt during its arcuate rotation. Shoulder bolt 46A associated with filter holder 30A is referenced. The three optic mounts are held one to another by a bolt 250 which passes through the counterbores of the lower locking portion of each of the three optic mounts. Counterbore 64A is referenced. The three optic mounts are aligned by the interlocking of opposing detent and nipple pairs on each of bases 32A–C. Detent 62A is shown. These detent and nipple pairs will be shown in greater detail in FIG. 7.

Figure 6:
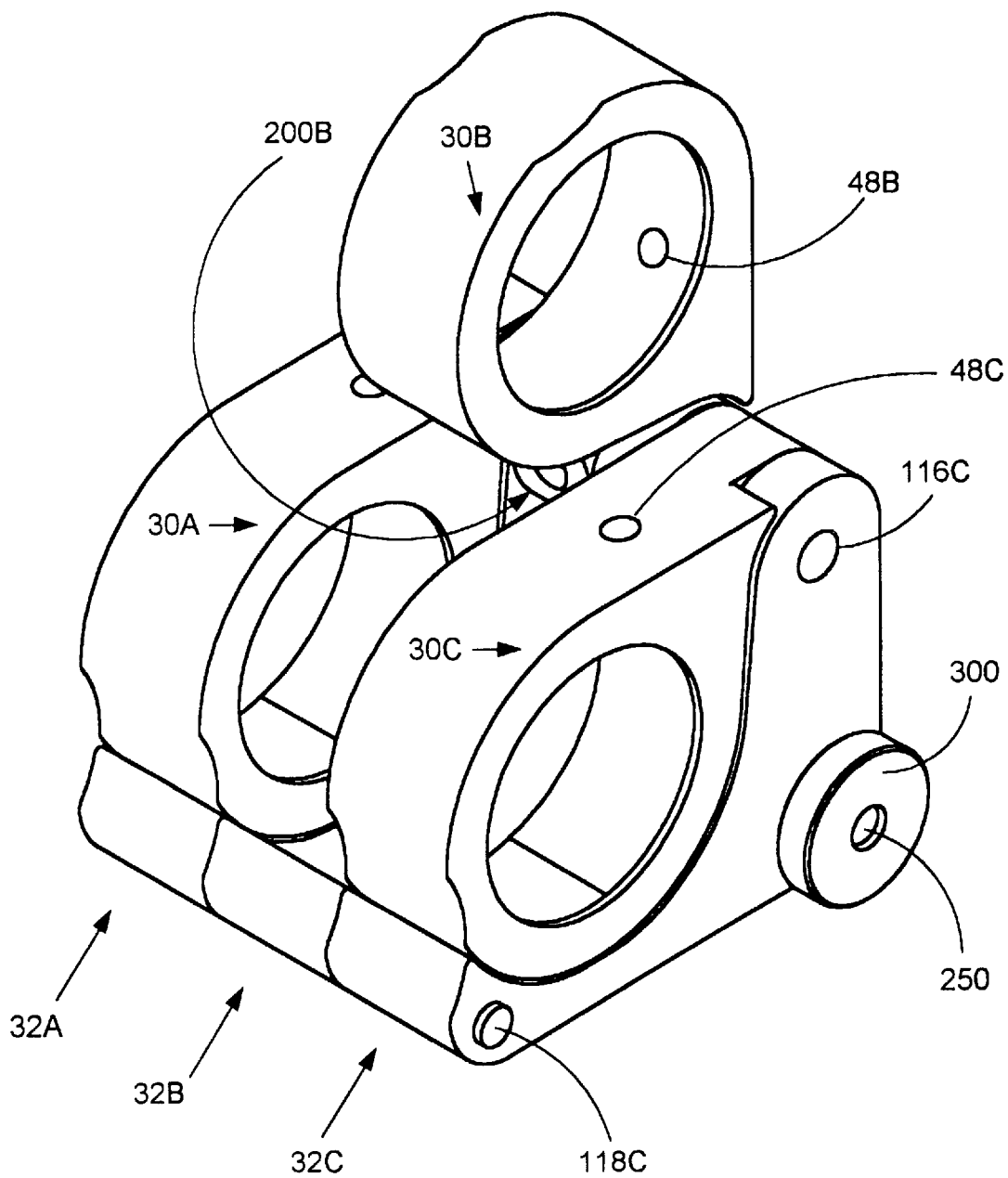
FIG. 6 is an isometric view of the back side of three optic mounts shown in FIG. 5.

FIG. 6 is an isometric view showing the back side of the modular configuration shown in FIG. 5. Filter holders 30A–C and bases respectively 32A–C is shown. The optic mounts are held together by pivot bolt 250 which passes through the counterbore associated with the lower locking portion of each of the three bases. The end of pivot bolt 250 is threaded into locking nut 300. The opposing nipple and detent pairs associated with each base align the optic mounts. Nipple 118C associated with the base portion 32A is shown. Filter holders 30A and 30C are shown in the first position with respect to their corresponding bases respectively 32A and 32C. The threaded hole 116C is shown in base 32C. Threaded holes 48B-C are shown in their corresponding filter holders respectively 30B-C. Filter holder 30B is in the second position with respect to its base 32B. In this second position hold-closed detent 200B of filter holder 30B, is exposed and referenced.

Figure 7:
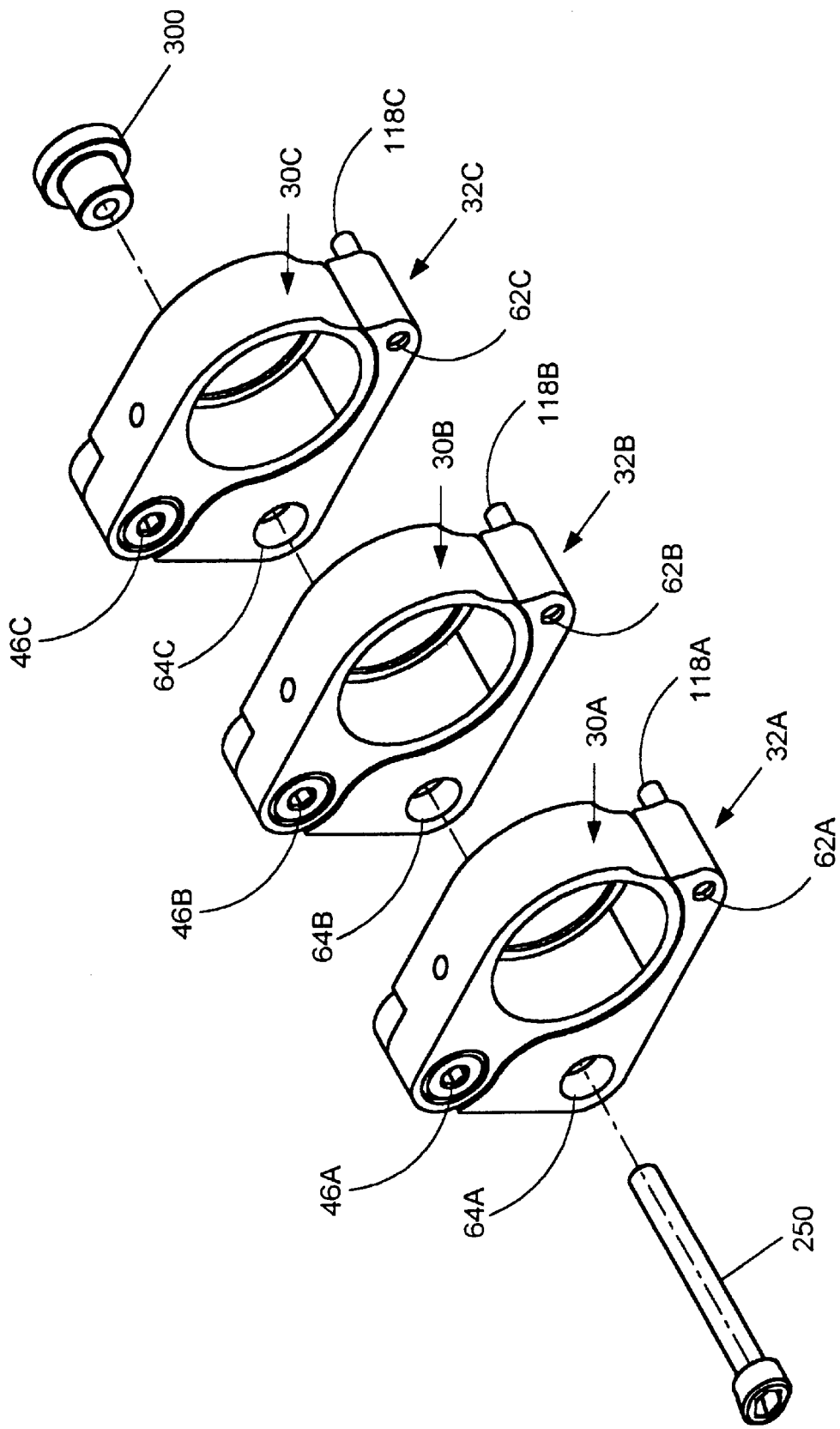
FIG. 7 is an exploded isometric view of the front side of the three optic mounts shown in FIGS. 5-6.

FIG. 7 is an exploded isometric view of the modular configuration of three optic mounts discussed above in connection with FIGS. 5-6. The filter holders 30A–C are held to each of the bases 32A–C by an individual shoulder bolt, respectively shoulder bolts 46A–C. Each of the base portions 32A–C has associated with it a counterbore respectively 64A–C and an opposing detent and nipple pair. Detents 62A–C are associated with respectively bases 32A–C. Nipples 118A–C are associated with respectively bases 32A–C. The three optic mounts are drawn together by pivot bolt 250 and locking nut 300. In the modular configuration, nipple 118A of base 32A engages detent 62B of base 32B. Additionally, nipple 118B associated with base 32B is engages detent 62C of base 32C. Thus, the three optic mounts are caused to assume a modular configuration in which all three are fastened and aligned one to another. Any number of optic mounts may be combined. The modular assembly can be attached to a single support column. For example, in FIG. 5 the support column 34 is attached to the middle one of the three optic mounts. A double-ended set screw, for example, can be threaded into the threaded base mount 54 associated with bases 32B and can be threaded into a corresponding threaded hold in the top of column 34.

Figure 8B:
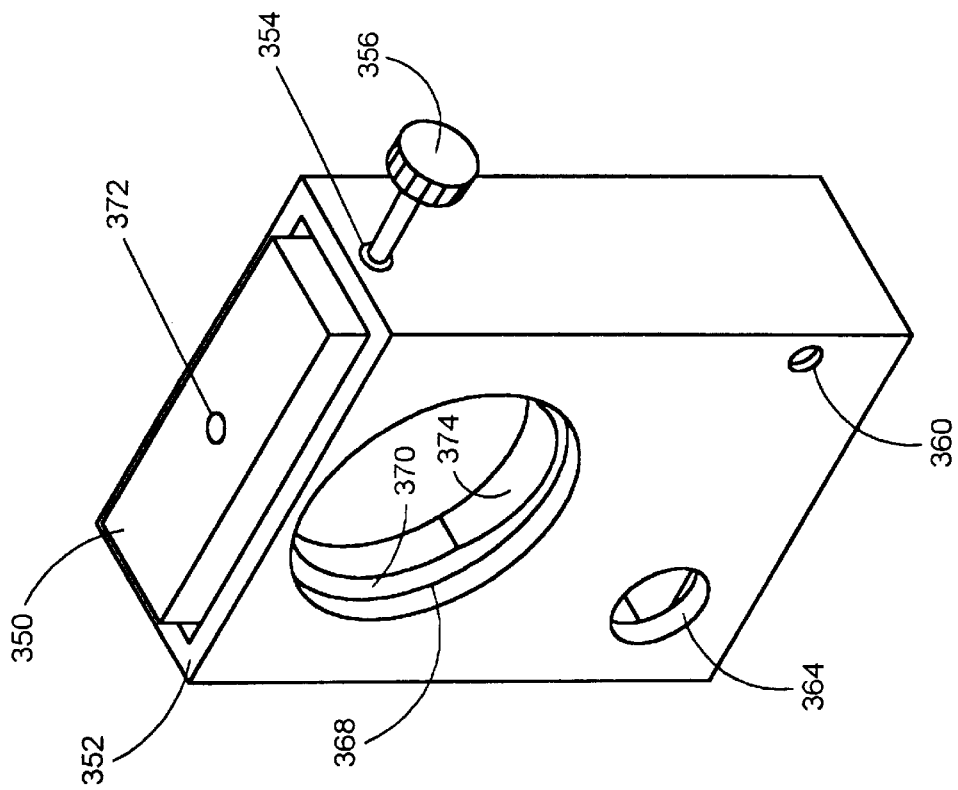
FIGS. 8A-B are front and rear isometric views of a telescoping optic holder in a retracted position.
Figure 8A:
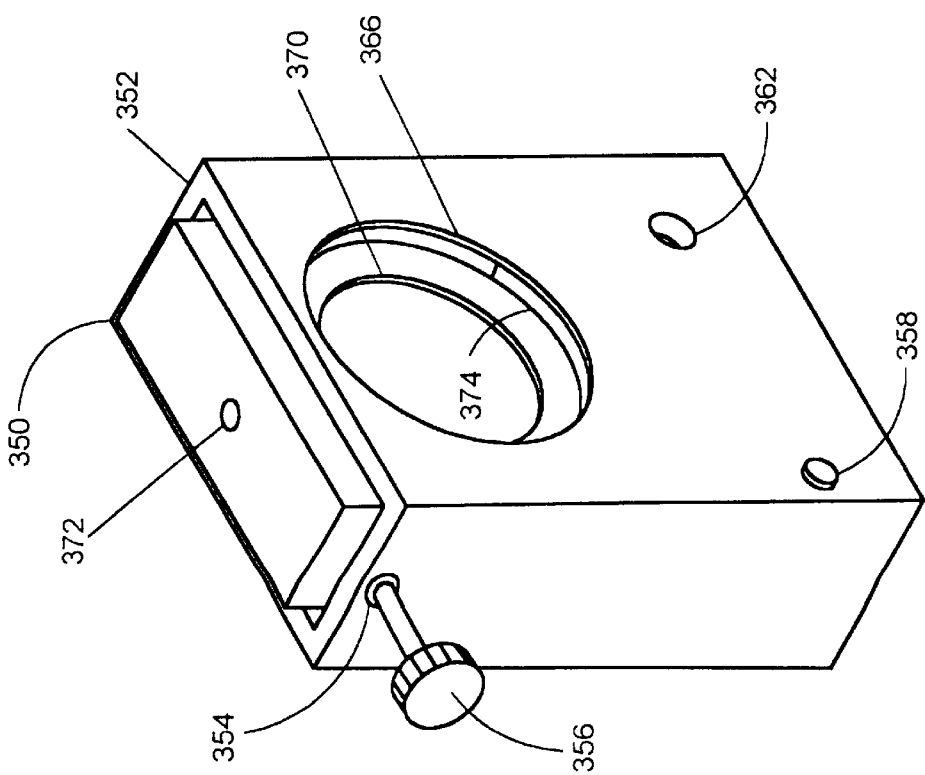

FIGS. 8A-B show an alternate embodiment of the positionable multi-optic holder. In these and the following drawings, a modular optic holder with a telescoping stage and base section is disclosed. In FIGS. 8A-B, front and rear isometric views of the telescoping optic holder in the retracted position are shown. The telescoping optic holder includes base 352, holder 350, and latch 356. Holder 350 includes a counter bore 370 and a threaded hole 372 for a set screw. Counter bore 370 includes an arcuate relief segment 374. Base 352 includes front and rear holes, respectively 366–368. Base 352 also includes front and rear modular fastening holes, respectively 362–364. Base 352 further includes alignment nipple 358 and a corresponding alignment detent 360. Finally, base 352 includes latch hole 354.

Holder 350 is held within a retracted position in base 352 by latch 356. Latch 356 engages holder 350 at an upper latch hole 380 [see FIGS. 9-10] and retains the holder in the retracted position with respect to the base. In the retracted position, front and rear base through holes 356–368 align with counter bore 370 of the holder to allow for the passage of a light path through an optic retained within counter bore 370 of holder 350. An optic can be considered positioned within a light path in either the retracted or the extended position.

Figure 9:
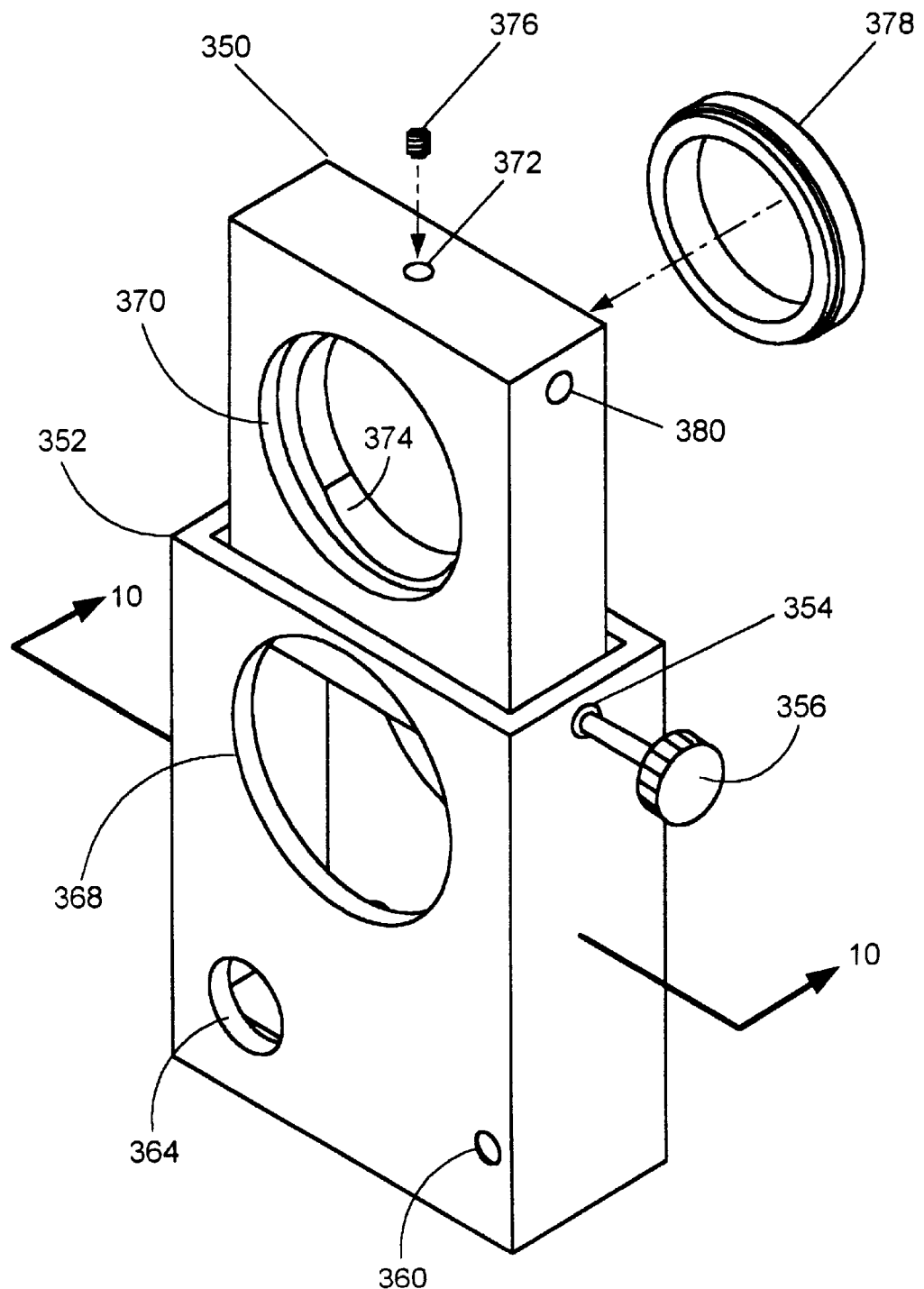
FIG. 9 is a isometric view of the telescoping optic holder of FIGS. 8A-B in an extended position.

FIG. 9 shows the telescoping holder of FIGS. 8A-B in an extended position. In FIG. 9 the holder and specifically the counter bore portion 370 of holder 350 extends beyond an upper face of base 352. An optic can be removed or replaced within counter bore 370. The holder 350 is held in the extended position by means of latch 356 which engages base 350 at a lower latch hole 382 [see FIGS. 10A-B].

In operation a thick or thin optic is mounted within counter bore 370 by either a set screw 376 or compression ring 378. A thick optic is held within counter bore 370 in a three point mounting system comprising the two axial lines between the arcuate relief segment 374 and the counter bore 370, and at a third point by set screw 376. A thin optic is held within counter bore 370 by means of a compression ring 378 which engages a threaded portion of the counterbore to compress a thin optic between the ring and a face of the counter bore.

FIGS. 10A-B are cross sectional views of the retracted and extended positions of the telescoping holder with respect to the base. The base 352 is shown in a cross section taken along line 10—10 of FIG. 9.

In FIG. 10A holder 350 is shown in the retracted position within base 352. Between a bottom face of holder 350 and a internal base face of base 352 is shown a compression spring 406 in the compressed position. Base 350 also includes an upper latch hole 380 and a lower latch hole 382. Latch pin 356 engages upper latch hole 380 to retain holder 350 within base 352. A column mounting hole 402 is shown on a lower exterior face of base 352. As discussed above in connection with FIGS. 1–7, the column mount hole can be used to attach the base holder pair to a mounting column.

In FIG. 10B holder 350 is shown in an extended position with respect to base 352. Spring 406 is shown in an extended position. Spring 406 is a compression spring which biases holder 350 to an extended position with respect to base 352. The holder 350 is locked in this extended position by the engagement of latch 356 with the lower latch hole 382 in the base 350. The back through hole 366 of the base is also shown.

Figure 11:
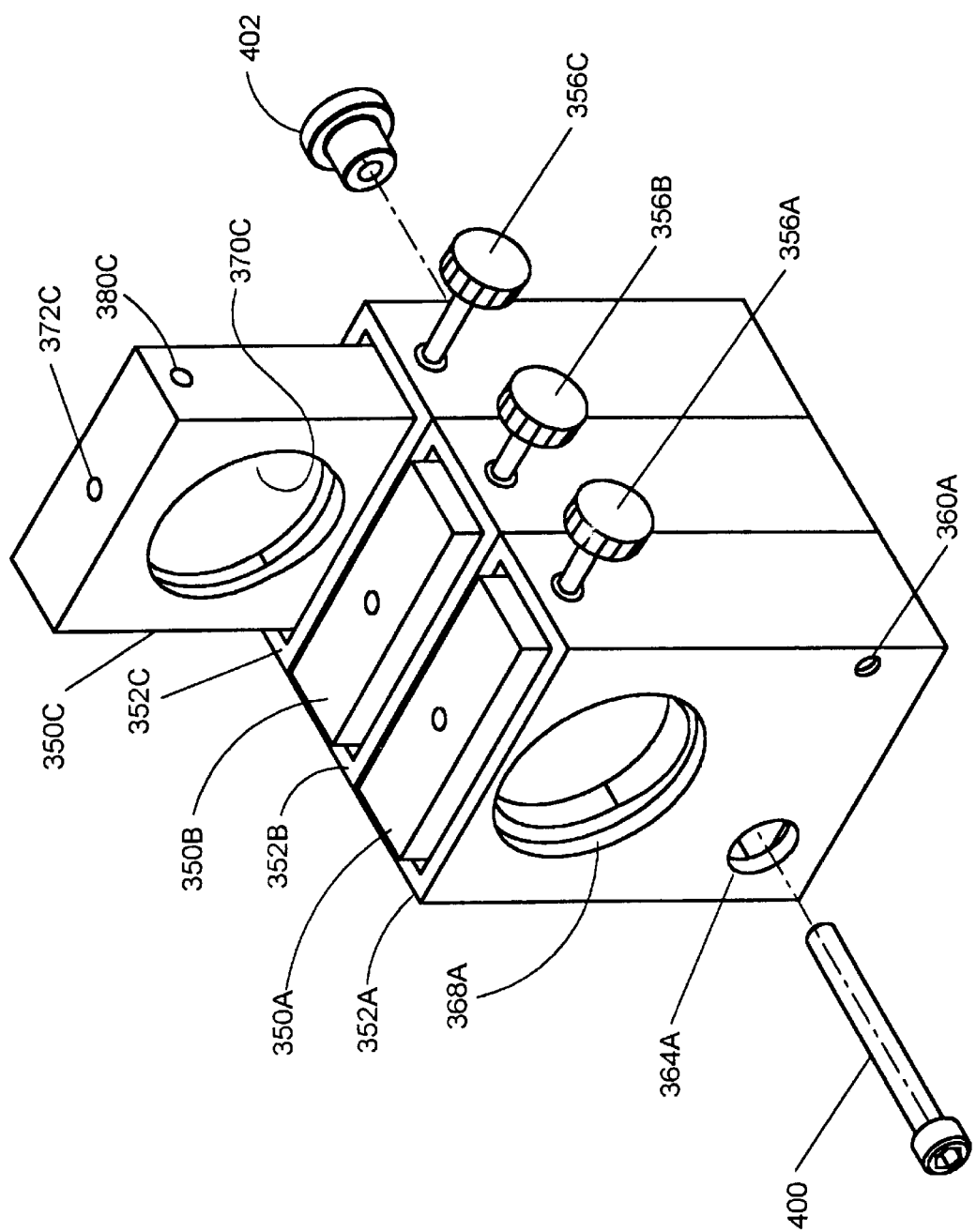
FIG. 11 is an isometric view of the telescoping optic holders in a modular configuration.

FIG. 11 shows a modular arrangement of the telescoping optic holder. This arrangement is similar to the arcuate modular optic holder shown in FIGS. 4-5. Bases 352A–C are each shown with a corresponding holder 350A–C. Latches 356A–C are shown. The front through hole 368A, the modular mounting hole 364A, and the detent 360A of the base 352A are shown. Bases 352A–C are held together by bolt 400 which passes through front mounting hole 364A and corresponding front and rear holes of the other base-holder pairs to an exit point at rear mounting hole 362C [not shown] of base 352C, where it engages nut 402 to compressively clamp the three bases 352A–C together. The base-holder pairs are aligned by engagement of corresponding nipple and detent pairs [358–360 not shown] on each base.

Latches 356A-B retain respectively holders 350A-B in a retracted position with respect to respectively bases 352A-B. Holder 350C is held in an extended position with respect to base 352C by latch 356C. The thick optic set screw hole 372C, the upper latch hole 380C, and the counter bore 370C of base 350C are exposed.

Although the foregoing invention has been described in detail for purposes of clarity of understanding, it will be obvious that certain modifications may be practiced within the scope of the appended claims.

What is claimed is:

1. An optic mount for holding an optic element in a light path, said optic mount comprising:
   a base defining a cavity between opposing first and second base faces;
   a holder dimensioned to fit within said cavity and including an opposing first and second holder faces and said opposing first and second holder faces defining an optic bore extending from said first to said second holder face, and said optic bore dimensioned to contain an optical element;

a bias member positioned in said cavity between said holder and said base to bias said holder from a first position within said cavity in which the optic bore avoids the light path, to a second position protruding from said cavity in which the light path passes through the optic bore.

2. The optic mount of claim 1, further comprising;

a latch member to retain said holder in said first and said second positions.

3. An optic mount for holding an optic element in a light path, said optic mount comprising:

a base defining a cavity between opposing first and second base faces and each of said first and said second base faces defining respectively first and second openings;

a holder dimensioned to fit within said cavity and including an opposing first and second holder faces and said opposing first and second holder faces defining an optic bore extending from said first to said second holder face, and said optic bore dimensioned to contain an optical element;

a bias member positioned in said cavity between said holder and said base to bias said holder from a first position within said cavity in which the optic bore is positioned within the light path, which light path passes through the first and second openings of the base, to a second position protruding from said cavity in which the optic bore avoids the light path.

4. The optic mount of claim 3, further comprising;

a latch member to retain said holder in said first and said second positions.

5. A modular configuration of optic mounts for holding a plurality of optic elements in a light path; said modular configuration comprising:

a. a first base and a second base each defining between opposing pairs of base faces a first cavity and a second cavity;

b. a first holder and a second holder each dimensioned to fit within respectively the first cavity of the first base and the second cavity of the second base, and said first and said second holder each including an opposing pair of holder faces and each of said first and said second holders defining between a corresponding one of the opposing pair of holder faces a first and a second optic bore, and the first and the second optic bore each dimensioned to contain an optical element; and c. a first and a second bias member positioned in resepecively said first and said second cavity between a corresponding first holder first base pair and second holder second base pair, and said first and said second bias member independently biasing respectively said first and said second holder from a first position within said first and said second cavity in which the first optic bore and the second optic bore avoids the light path, to a second position protruding from said cavity in which the light path passes through the first optic bore and the second optic bore.

6. The modular configuration of optic mounts of claim 5, wherein said first base is aligned with said second base by complementary interlocking elements defined on corresponding first and the second base faces.

7. The modular configuration of optic mounts of claim 5, wherein:

said first and said second bases each further define respectively a first and a second clamping aperature; and wherein the modular configuration of optic mounts further includes; a fastener which passes through the first and the second clamping aperatures to fasten said first base to said second base.

8. The modular configuration of optic mounts of claim 5, further comprising;

a first and a second latch member to retain respectively said first holder and said second holder in said first and said second positions.

9. A modular configuration of optic mounts for holding a plurality of optic elements in a light path; said modular configuration comprising:

a. a first base and a second base each defining between opposing pairs of base faces a first cavity and a second cavity, and each of said opposing pairs of base faces of said first and said second base each defining opposing openings;

b. a first holder and a second holder each dimensioned to fit within respectively the first cavity of the first base and the second cavity of the second base, and said first and said second holder each including an opposing pair of holder faces and each of said first and said second holders defining between a corresponding opposing pair of the holder faces a first and a second optic bore, and the first and the second optic bore each dimensioned to contain an optical element; and c. a first and a second bias member positioned in resepecively said first and said second cavity between a corresponding first holder first base pair and second holder second base pair, and said first and said second bias member independently biasing respectively said first and said second holder from a first position within said first and said second cavity in which the first optic bore and the second optic bore are in the light path passing through the openings, to a second position protruding from said first and said second cavity in which the first optic bore and the second optic bore avoid the light path.

10. The modular configuration of optic mounts of claim 9, wherein said first base is aligned with said second base by complementary interlocking elements defined on corresponding first and the second base faces.

11. The modular configuration of optic mounts of claim 9, wherein:

said first and said second bases each further define respectively a first and a second clamping aperature; and wherein the modular configuration of optic mounts further includes;

a fastener which passes through the first and the second clamping aperatures to fasten said first base to said second base.

12. The modular configuration of optic mounts of claim 9, further comprising;

a first and a second latch member to retain respectively said first holder and said second holder in said first and said second positions.

* * * * *